Patented Mar. 14, 1950

2,500,171

UNITED STATES PATENT OFFICE 2,500,171

PROCESS FOR IMPROVING THE FLAVOR OF CERTAIN WINES

Russell H. Gause, Glendale, Ohio, assignor to National Distillers Products Corporation, a corporation of Virginia No Drawing. Application January 25, 1946, Serial No. 643,463

4 Claims. (Cl. 99—35)

This invention is a new and useful process for improving the flavor of certain wines and is a continuation in part of my prior application, Serial No. 523,734 filed February 24, 1944, now abandoned.

The wines produced from grapes grown in certain districts have an unsatisfactory flavor and are therefore marketed at a disadvantage and lower price in comparison with wines produced from grapes grown in other districts. Examples of such wines are the wines produced from the grapes grown in the San Joaquin and Fresno districts of California. Such wines may be characterized by an insipid and/or flat and/or bitter and/or brackish taste.

I have discovered that the flavor of such wines may be improved by adding thereto a hydrogen ion exchange material in controlled amounts to produce a pH change within specified limits. This treatment is applied to the wine in the condition in which it is produced by expressing and fermenting grapes. In this condition the wine will be on the acid side and in general will have a pH numerically not in excess of 4.5. The actual flavor of the wine may be due to various components not yet accurately identified or evaluated since the pH is not an index of the flavor of the wine. In some cases, for example, such wines with a pH of about 4 may have a satisfactory flavor whereas other wines with a pH of about 3 may be insipid and flat. In any case, however, I have found that the flavor of such wines, initially unsatisfactory, may be materially improved by adding to the wine a cation exchange material of the hydrogen ion exchange type in amount sufficient to shift the pH from 0.05 to 0.6 points in the direction of increasing acidity.

The hydrogen ion exchange material referred to may be any solid water-insoluble hydrogen ion exchange material. One such material is a cation exchange resin of the hydrogen ion exchange type. Such a material may be made by treating a cation exchange resin of the type designated in the market as Amberlite IR–1 with a dilute aqueous solution of hydrochloric acid and separating the resin so treated from the aqueous acid and washing the hydrochloric acid from the treated resin before it is used to treat the wine. Another such material is that designated in the market as Zeo-Karb H.

The amount of hydrogen ion exchange material required is only a small proportion of the amount of wine treated and not in any case more than a few per cent of the same. The treatment may be carried out in bulk by adding the hydrogen ion exchange material in small portions to a batch of the wine while stirring to promote thorough contact and continuing the addition of small portions of material until the desired flavor has been produced. If the requisite amount has been determined in advance it may, of course, be all added at once. Alternatively, the wine to be treated may be flowed through a body of the material and collected in a suitable storage tank until the average composition of the wine collected in the storage tank is of the desired flavor.

In actual practice, I have found that the desired flavor will be produced by a shift in the initial pH of the wine from 0.05 to 0.6 points in the direction of increasing acidity. It is advisable to select a point within this range at which the optimum flavor is produced.

Following treatment, the wine is separated from the hydrogen ion exchange material by filtration or decantation.

While the wines so treated have lost their unsatisfactory flavor and have acquired a desirable flavor, they have not taken up any deleterious material.

The following are examples of the application of my process.

Example I

A California dry white wine with an initial pH of 3.22 and a flavor that was insipid and flat was treated with a cation exchange resin of the hydrogen exchange type by adding 0.5 gram of Amberlite IR–1 to 100 cc. of the said wine at a temperature of 25° C. Contact was promoted by mixing for a period of 60 minutes, at the expiration of which the cation exchange resin was separated by filtration. The wine so treated had lost its insipid and flat character and had a balanced zestful flavor. The pH of the treated wine was 2.93.

Example II

A California dry wine with an initial pH of 3.51 and a flavor that was undesirably bitter was treated with a cation resin of the hydrogen ion exchange type by adding 0.25 gram of the Amberlite IR–1 to 100 cc. of the said wine at a temperature of 25° C. Contact was promoted by mixing for a period of 60 minutes, at the expiration of which time the cation exchange resin was separated by filtration. The wine so treated had lost its bitter flavor and had acquired a fruity flavor. The pH of the treated wine was 3.42.

Example III

A Portuguese port wine with an initial pH of 4.02 and a flavor that was undesirably sweet was treated with a cation exchange resin of the hydrogen ion exchange type by adding one gram of Amberlite IR-1 to 100 cc. of the said wine at a temperature of 25° C. Contact was promoted by mixing for a period of 60 minutes, at the expiration of which time the cation exchange resin was separated by filtration. The wine so treated had lost its undesirably sweet flavor and had acquired a desirable tart flavor. The pH of the treated wine was 3.50.

*Example IV*

A California dry white wine with initial pH of 3.63 and a flat and brackish taste was treated with a cation ion exchange resin of the hydrogen ion exchange type by adding 0.4 gram of Zeo-Karb H to 100 cc. of the said wine at a temperature of 25° C. Contact was promoted by mixing for a period of 60 minutes, at the expiration of which time the cation exchange resin was separated by filtration. The wine so treated had lost its brackish taste; however, a part of the original flatness persisted. The pH of the treated wine was 3.50.

The foregoing description is by way of illustration and not of limitation and I am not to be limited to any details but only by the appended claims or their equivalents in which I have endeavored to claim broadly all inherent novelty.

I claim:

1. Process of improving the flavor of wines of unsatisfactory flavor which consists in adding to such a wine directly as it is obtained upon the fermenting of expressed grapes and having a predetermined acidity, a solid water-insoluble hydrogen ion exchange material in amount sufficient to reduce the pH of said predetermined acidity from 0.05 to 0.6 points in the direction of increasing acidity and separating the wine so treated from said hydrogen ion exchange material.

2. Process according to claim 1 in which the hydrogen ion exchange material is a cation exchange resin of the hydrogen exchange type.

3. Process of improving the flavor of wines of unsatisfactory flavor which consists in adding to such a wine directly as it is obtained upon the fermenting of expressed grapes, and having an initial pH of predetermined acidity numerically not exceeding 4.5 a solid water-insoluble hydrogen ion exchange material in amount sufficient to reduce the pH of said predetermined acidity from 0.05 to 0.6 points in the direction of increasing acidity and separating the wine so treated from said hydrogen ion exchange material.

4. Process according to claim 3 in which the hydrogen ion exchange material is a cation exchange resin of the hydrogen exchange type.

RUSSELL H. GAUSE.

REFERENCES CITED

The following references are of record in the file of this patent:

UNITED STATES PATENTS

| Number | Name | Date |
|---|---|---|
| 2,258,216 | Ramage | Oct. 7, 1941 |

OTHER REFERENCES

Tiger et al.: "Demineralizing solutions by a two-step ion exchange process," Industrial and Engineering Chemistry, volume 35, No. 2, pages 186–192.